United States Patent
Gordon et al.

(10) Patent No.: US 9,900,736 B1
(45) Date of Patent: *Feb. 20, 2018

(54) ASSOCIATING A MOBILE STATION WITH AN AUDIO INCIDENT

(71) Applicant: Polaris Wireless, Inc., Mountain View, CA (US)

(72) Inventors: Scot Douglas Gordon, Redmond, WA (US); Mahesh B. Patel, Saratoga, CA (US); Bhavin Pankaj Shah, Sunnyvale, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/221,146

(22) Filed: Jul. 27, 2016

Related U.S. Application Data

(63) Continuation of application No. 14/193,259, filed on Feb. 28, 2014, now Pat. No. 9,432,803.

(51) Int. Cl.
*H04W 4/02* (2009.01)
*G06F 17/30* (2006.01)

(52) U.S. Cl.
CPC ........ *H04W 4/02* (2013.01); *G06F 17/30241* (2013.01)

(58) Field of Classification Search
CPC ......... H04W 4/02; H04W 4/025; H04W 4/12; H04W 4/14; H04W 4/22; G06F 17/302412
USPC .................................................... 340/539.13
See application file for complete search history.

(56) References Cited

U.S. PATENT DOCUMENTS

| | | | |
|---|---|---|---|
| 7,855,935 | B1 | 12/2010 | Lauder et al. |
| 9,432,803 | B1 * | 8/2016 | Gordon ............... H04W 4/02 |
| 2006/0116124 | A1 | 6/2006 | Signore et al. |
| 2006/0223492 | A1 | 10/2006 | Chin et al. |
| 2006/0256660 | A1 | 11/2006 | Berger |
| 2006/0258369 | A1 | 11/2006 | Burroughs et al. |
| 2011/0169633 | A1 | 7/2011 | Lauder et al. |

OTHER PUBLICATIONS

"Office Action" issued in parent U.S. Appl. No. 14/193,259, dated Feb. 1, 2016, Publisher: USPTO, Published in: US.
"Notice of Allowance" dated Jul. 20, 2016 in U.S. Appl. No. 14/193,259.
"Office Action" dated Aug. 20, 2015 issued in U.S. Appl. No. 14/193,259.

* cited by examiner

*Primary Examiner* — Marisol Figueroa
(74) *Attorney, Agent, or Firm* — McGeary Cukor LLC; Kenneth Ottesen; Jason Paul DeMont

(57) ABSTRACT

Systems and methods are disclosed that initiate mobile-terminated location requests in response to receiving an indication that an audio incident occurred at a given location. The mobile-terminated location requests are initiated for one or more mobile stations within a cell of a wireless network that is known to provide wireless service coverage to a geographic area that comprises the location of the audio incident. In response to the mobile-terminated location request, an estimate of the mobile station's current location is received. Based on the estimated current location of the mobile station relative to the location of the audio incident, the illustrative systems and methods may generate an association between the mobile station and the audio incident. When an association is generated, it is transmitted for possible further processing.

19 Claims, 8 Drawing Sheets

ASSOCIATING A MOBILE STATION WITH AN AUDIO INCIDENT

CROSS-REFERENCE TO RELATED APPLICATIONS

This application claims the benefit of U.S. patent application Ser. No. 14/193,259, filed on Feb. 28, 2014, entitled "Associating a mobile station with an audio incident", which is incorporated by reference herein.

FIELD OF THE INVENTION

The present invention relates to telecommunications in general, and, more particularly, to associating one or more mobile stations with an audio incident occurring at a location.

BACKGROUND OF THE INVENTION

A wireless telecommunications network provides wireless telecommunications service to users of mobile stations (e.g., "smartphones", etc.) within a geographic region. The salient advantage of wireless telecommunications over wireline telecommunications is the mobility that is afforded to the user of the mobile station. On the other hand, the salient disadvantage of wireless telecommunications lies in that fact that because the mobile station is mobile, an interested party might not be able to readily ascertain the location of the mobile station.

There are many techniques in the prior art for estimating the location of a mobile station. The common theme to these techniques is that the location of the mobile station is estimated based on the electromagnetic (e.g., radio, etc.) signals—in one form or another—that are processed (i.e., transmitted or received) by the mobile station.

In accordance with one family of techniques, the location of a mobile station is estimated based on the transmission range of the base stations with which the mobile station is communicating. Because the range of a base station is known to be N meters, this family of techniques provides an estimate for the location that is generally accurate to within N meters. A common name for this family of techniques is "cell identification" or "cell ID."

In accordance with a second family of techniques, the location of a mobile station is estimated by analyzing the angle of arrival or time of arrival of the signals transmitted by the mobile station. A common, if somewhat inaccurate, name for this family of techniques is called "triangulation."

In accordance with a third family of techniques, the location of a mobile station is estimated by a receiver in the mobile station that receives signals from satellites in orbit. A common name for this family of techniques is "GPS," which stands for "global positioning system."

In accordance with a fourth family of techniques, the location of a mobile station is estimated by pattern matching one or more location-dependent traits of one or more electromagnetic signals that are processed (i.e., transmitted and/or received) by the mobile station. Common names for this family of techniques include "Wireless Location Signatures," "RF Pattern Matching," and "RF Fingerprinting."

The basic idea behind the Wireless Location Signatures technique is that some traits of an electromagnetic signal remain (more or less) constant as a signal travels from a transmitter to a receiver (e.g., frequency, etc.) and some traits change (e.g., signal strength, relative multi-path component magnitude, propagation delay, etc.). A trait that changes is considered a "location-dependent" trait. Each location can be described or associated with a profile of one or more location-dependent traits of one or more electromagnetic signals. A mobile station at an unknown location can observe the traits and then attempt to ascertain its location by comparing the observed traits with a database that correlates locations with expected or predicted traits. Advantages of the Wireless Location Signatures technique are that it is highly accurate and works well indoors, in heavily-wooded forests, and in urban canyons.

Parties who are interested in knowing the location of a mobile station might include both the user of the mobile station and remote parties. There are a variety of reasons why the user of a mobile station might be interested in knowing his or her location. For example, the user might be interested in telling a remote party where he or she is or the user might seek advice in navigation.

In addition, there are a variety of reasons why a remote party might be interested in knowing the location of the user. For example, the recipient of an 9-1-1 emergency call from a user might be interested in knowing the location of the mobile station so that emergency services vehicles can be dispatched to the user. On the other hand, law enforcement might be interested in knowing the location of the mobile station if the mobile station user is a crime suspect.

For example, and in regard to law enforcement as an interested party, systems and methods are disclosed in U.S. Pat. No. 8,351,297 for processing information associated with monitoring persons/devices and weapon fire location information. When a device, such as a mobile station, is found nearby a gunshot location, associated graphical information can be presented on the output of the weapon fire location system or an associated display used by those monitoring the persons of interest.

SUMMARY OF THE INVENTION

There are various prior-art techniques that utilize location estimates, as alluded to above. A problem with such prior-art techniques, however, is that at least some of them rely on querying a database, such as that of a cellular phone system operator, in which the database is burdened with maintaining location data for possibly millions of mobile stations. Such a database might have a substantial amount of stale location data. Consequently, using the stale location data to infer something a mobile station and its user can yield an unacceptable number of "false positives." False positives in a law enforcement application, for example, might ultimately result in people being mistakenly identified as having been at the scene of a gunshot.

The present invention provides a system and method for associating one or more mobile stations with an audio incident. A gunshot, possibly caused by a suspect carrying a smartphone or other type of mobile station, is one example of an audio incident, although the present invention contemplates other types of audio incidents as well.

In accordance with an illustrative embodiment of the present invention, an audio incident is detected as having occurred at an indicated location that is provided to a telecommunications analysis server. After receiving the indicated location, the server determines which coverage area includes the indicated location of the audio incident, within one or more wireless networks that provide telecommunications service to mobile stations. The coverage area can be a paging area, a cell, or some other region within each wireless network.

The server then initiates mobile-terminated location requests (MT-LR) to one or more mobile stations in response to receiving the audio incident's location. The mobile-terminated location requests are generated for one or more mobile stations within the coverage area determined above. In response to the mobile-terminated location request, an estimate of the mobile station's current location is received. Based on the estimated current location of the mobile station relative to the location of the audio incident, the illustrative systems and methods may generate an association between the mobile station and the audio incident.

In accordance with the illustrative embodiment, the location estimate is based on the family of techniques referred to above as "Wireless Location Signatures," but any estimation technique that can use mobile-terminated location requests is within the scope of the embodiments disclosed herein.

When an association is generated, it is transmitted for possible further processing. For example, when the audio incident is determined to be a gunshot, the mobile station can be looked up in a database to determine its owner. A determination can subsequently be made as to whether its owner, who might have been the person carrying the mobile station at the time and location of the gunshot, should be considered a person of interest in the shooting, or should be contacted to find out who else was using his phone at the time of the gunshot.

In contrast to some techniques in the prior art, the inventive technique disclosed herein triggers a location determination that is based on location data obtained, at least in part, as the result of the triggering process. Furthermore, any association made between one or more mobile stations and an audio incident, is based on an estimate of the current location of the mobile station obtained as the result of the triggering process. Advantageously, this can reduce the number of false positives that would otherwise occur.

An illustrative method of the present invention comprises: receiving, by a server computer, an indication of an audio incident, wherein the indication indicates a location L of the audio incident; initiating, by the server computer, a first mobile-terminated location request (MT-LR) for a first mobile station in a first wireless network with a coverage area that comprises the location L, wherein the initiating is based on the location L indicated by the received indication; and transmitting, by the server computer, an indicium of the first mobile station to another server computer, based on an estimate of the current location of the first mobile station that is based on the first MT-LR.

An illustrative system of the present invention comprises: a receiver that is configured for receiving an indication of an audio incident, wherein the indication indicates a location L of the audio incident; a processor that is configured for initiating a first mobile-terminated location request (MT-LR) for a first mobile station in a first wireless network with a coverage area that comprises the location L, wherein the initiating is based on the location L indicated by the received indication; and a transmitter that is configured for transmitting an indicium of the first mobile station to a server computer, based on an estimate of the current location of the first mobile station that is based on the first MT-LR.

Another illustrative method of the present invention comprises: identifying, by a server computer, a cell that provides wireless service coverage to a geographic area that comprises a location L of an audio incident, wherein the identifying is in response to an indication of the audio incident at the location L; initiating, by the server computer, a first mobile-terminated location request (MT-LR) for a first mobile station that is served by the identified cell; receiving, by the server computer, an estimate of a current location of the first mobile station in response to the first MT-LR; generating, by the server computer, an association between the first mobile station and the audio incident, wherein the generating of the association is based on the estimate of the current location of the first mobile station; and transmitting, by the server computer, the association to another server computer.

Another illustrative system of the present invention comprises: a receiver for receiving an estimate of a current location of the first mobile station in response to the first MT-LR; a processor for: i) identifying a cell that provides wireless service coverage to a geographic area that comprises a location L of an audio incident, wherein the identifying is in response to an indication of the audio incident at the location L, ii) initiating a first mobile-terminated location request (MT-LR) for a first mobile station that is served by the identified cell, wherein the estimate of the current location of the first mobile station is received in response to the first MT-LR, and iii) generating an association between the first mobile station and the audio incident, wherein the generating of the association is based on the estimate of the current location of the first mobile station; and a transmitter for transmitting the association to a server computer.

DETAILED DESCRIPTION

For the purposes of the present specification, the following terms and their inflected forms are defined as follows:

1. A "location L" is defined as any one of a zero-dimensional point, a one-dimensional line, a two-dimensional area, or a three-dimensional volume. Thus, a location can be described, for example, by a street address, geographic coordinates ("geo-location"), a perimeter, a virtual perimeter surrounding a geographic area (i.e., a "geofence"), a cell ID of a wireless network, or an enhanced cell ID in a wireless network.

2. A "time T" is defined as a calendrical time as denominated in one or more measures (e.g., seconds, minutes, hours, time of day, day, day of week, month, month of year, year, etc.).

3. A "mobile station" is defined as an apparatus that:
   receives signals from another apparatus without a wire, or
   transmits signals to another apparatus without a wire, or
   both (i) and (ii).

This term is used synonymously herein with: wireless terminal, wireless telecommunications terminal, user equipment, mobile terminal, mobile phone, cellular phone, cell phone, mobile handset, mobile communication handset, and mobile unit, as well as other terms identified elsewhere herein.

Other terms may also be defined elsewhere herein.

Figure 1:
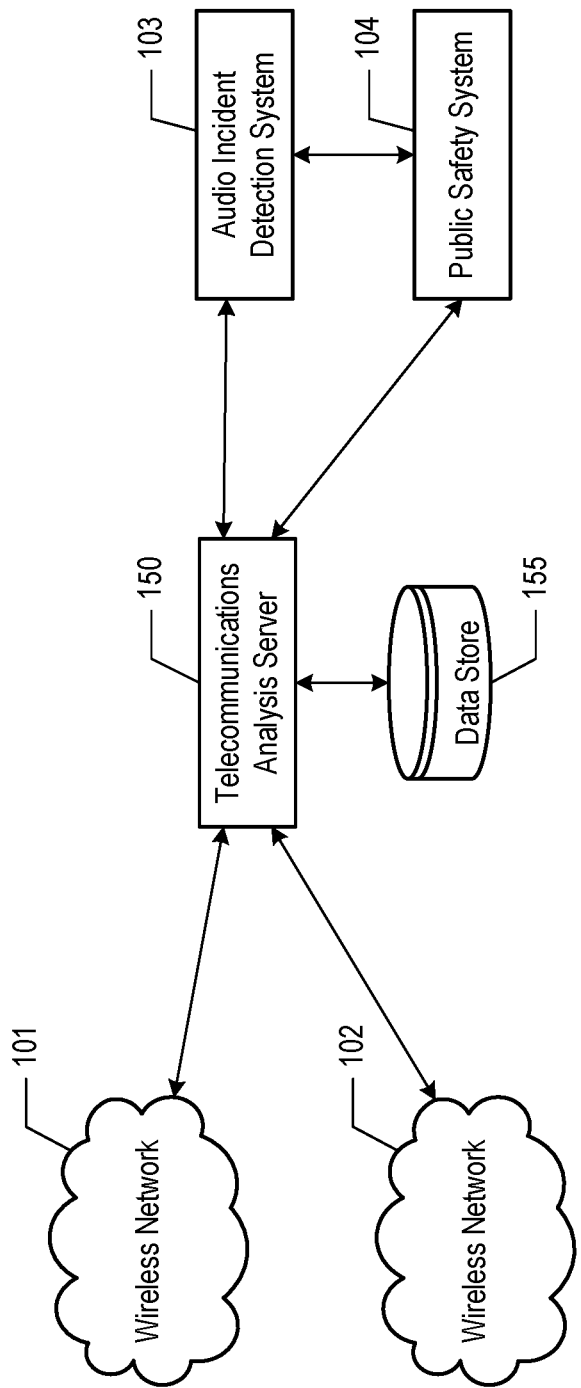
FIG. 1 depicts a schematic diagram of a portion of telecommunications system 100 according to an illustrative embodiment of the present invention.

FIG. 1 depicts a schematic diagram of a portion of telecommunications system 100 according to an illustrative embodiment of the present invention. Telecommunications system 100 comprises wireless network 101, wireless network 102, audio incident detection system 103, public safety system 104, telecommunications analysis server 150, and data store 155, interconnected as shown. Telecommunications system 100 provides telecommunications service to one or more mobile stations in wireless networks 101 and 102, and also provides other services affecting one or more mobile stations in networks 101 and 102, as described in detail below.

Wireless network 101 and 102 each comprise telecommunications equipment that provides wireless telecommunications service to a plurality of mobile stations in a manner well known in the art. According to the illustrative embodiment, each wireless network provides wireless service in accordance with the air-interface standard of the 3rd Generation Partnership Project ("3GPP"). Examples of 3GPP air-interface standards include GSM, UMTS, and LTE, which are known to those skilled in the art. After reading this disclosure, however, it will be clear to those skilled in the art how to make and use alternative embodiments of the present invention that operate in conjunction with wireless networks under other air-interface standards (e.g., CDMA-2000, IS-136 TDMA, IS-95 CDMA, 3G Wideband CDMA, IEEE 802.11 Wi-Fi, 802.16 WiMax, Bluetooth, etc.) in one or more frequency bands. It will be clear to those having ordinary skill in the art how to recognize and implement the corresponding terms, if any, for non-3GPP types of wireless networks with respect to other embodiments of the present invention.

In accordance with an illustrative embodiment of the present invention, a first service provider and a second provider operate, administer, maintain, and provision wireless network 101 and wireless network 102, respectively. As those who are skilled in the art will appreciate, however, after reading this specification, the same service provider can perform such functions for both wireless networks. Wireless network 101, which serves as an illustrative wireless network for the purpose of describing the various embodiments of the present invention, is described in further detail below and with respect to at least some of the other figures.

It will be clear to those having ordinary skill in the art, after reading the present disclosure, how to make and use alternative embodiments wherein telecommunications system 100 supports any number of wireless networks, such as one wireless network, three wireless networks, etc.; a different number and kind of public safety systems, such as an emergency 911 handling system, a police dispatch system, and/or a surveillance system, etc.; any number of audio incident detection systems, such as two audio detection systems, three audio detection systems, etc.

Audio incident detection system 103 determines whether a relevant audio incident has occurred, such as a gunshot, weapons fire, an explosion, a vehicle crash, and so on. A system for detecting weapons fire, for example, is disclosed in U.S. Pat. No. 7,855,935, which is incorporated herein by reference. Audio incident detection system 103 ascertains and reports the audio incident's location and time of occurrence according to technology that is well known in the art. According to the illustrative embodiment, audio incident detection system 103 reports the location and time of occurrence to telecommunications analysis server 150 and to public safety system 104. It will be clear to those having ordinary skill in the art, after reading the present disclosure, how to make and use alternative embodiments of the present invention wherein audio incident detection system 103 does not report directly to public safety system 104 and/or is not connected to public safety system 104.

Public safety system 104 is well known in the art. According to the illustrative embodiment, public safety system 104 is a police dispatch center that receives signals from audio incident detection system 103 reporting on detected audio incidents and also receives signals from telecommunications analysis server 150 as described in further detail below. Although the present figure illustrates only one public safety system 104, it will be clear to those having ordinary skill in the art how to make and build alternative embodiments of the present invention that operate with a plurality of public safety system and with other systems (e.g., emergency 911 center, surveillance system, etc.) that receive reports from telecommunications analysis server 150.

Telecommunications analysis server 150 is a server computer that performs and coordinates the operations described in more detail below. According to the illustrative embodiment, telecommunications analysis server 150 performs and coordinates the operations of method 600. Other aspects of telecommunications analysis server 150 and method 600 are described in more detail below and in the accompanying figures.

It will be clear to those having ordinary skill in the art, after reading the present disclosure, how to make and use alternative embodiments wherein telecommunications analysis server 150 is connected differently to the other illustrated systems and networks, e.g., via the public switched telephone network, via the Internet, via one or more private data networks, via a combination thereof, etc.

It will be further clear to those having ordinary skill in the art, after reading the present disclosure, how to make and use alternative embodiments wherein telecommunications analysis server 150 including its component elements is configured within one of the other systems and/or networks, whether as a logical component, as a physical component, and/or as a fully integrated component, e.g., within wireless network 101 or 102, within audio incident system 103, within public safety system 104, etc.

Data store 155 is a data storage, retrieval, and archiving medium that is well known in the art, e.g., a hard disk. Data store 155 stores data (e.g., location estimates generated by location engine 113, network management reports collected from operational mobile stations, etc.) as well as results generated by server 150. It will be clear to those having ordinary skill in the art, after reading the present disclosure, how to make and use alternative embodiments of the present invention without a data store 155, or with any number of data stores 155, e.g., two data stores, three data stores, etc., or wherein data store 155 is an integral part of server 150.

It is to be understood that numerous other configurations of telecommunications system 100 in conjunction with one or more other networks (wired and/or wireless) and in conjunction with one or more audio incident detection systems can be made and used by those having ordinary skill in the art after reading the present specification.

Figure 2A:
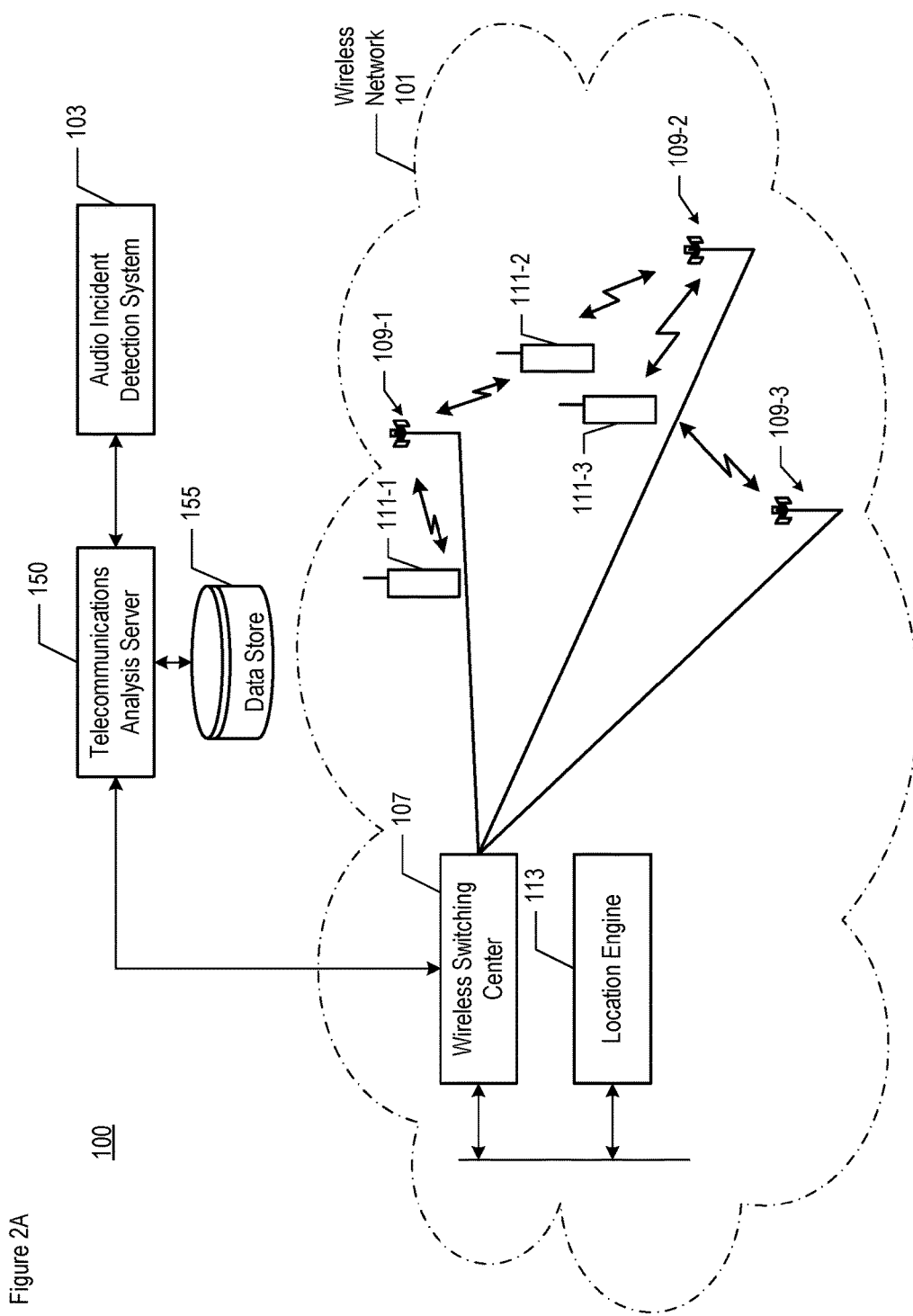
FIG. 2A depicts a schematic diagram of some salient portions of wireless network 101 depicted in FIG. 1, within telecommunications system 100.

FIG. 2A depicts a schematic diagram of some salient portions of wireless network 101 depicted in FIG. 1, within telecommunications system 100. Wireless network 101 comprises: wireless switching center 107, base transceiver stations 109-1, 109-2, and 109-3 (and other base transceiver stations 109-i, wherein i is a positive integer), and location engine 113. These elements are generally referred to herein as elements of the "network infrastructure." Wireless network 101 provides wireless telecommunications service to mobile stations 111-1, 111-2, and 111-3 (and other mobile stations 111-k, wherein k is a positive integer). Wireless network 101 is interconnected to telecommunications analysis server 150 and audio incident detection system 103 as shown.

Wireless network 101 also comprises other elements, e.g., gateway mobile location center ("GMLC"), base station controllers ("BSCs"), home location register ("HLR"), visitor location register(s) ("VLR"), etc., which are not depicted here for the purposes of simplicity and ease of understanding. Those having ordinary skill in the art will know how such elements operate within wireless network 101, and, after reading the present disclosure, how to make and use embodiments of the present invention that operate with these elements, e.g., what information is available from such elements, how to request information from such elements, how to receive information from such elements, etc.

Wireless network 101 also comprises one or more additional instantiations of the shown elements, e.g., a plurality of wireless switching centers 107, and optionally a plurality of location engines 113, etc., which are not depicted here for the purpose of simplicity. Those having ordinary skill in the art will know how such additional elements operate within wireless network 101, and, after reading the present disclosure, how to make and use embodiments of the present invention that operate with these additional elements, e.g., what information is available from such elements, how to request information from such elements, how to receive information from such elements, etc.

The depicted interconnections among the illustrated elements are simplified for the purpose of easing understanding, but those having ordinary skill in the art will know how to build embodiments of the present invention to interconnect with the illustrated elements of wireless network 101. For simplicity and ease of understanding, wireless switching center 107 is shown directly connected to the base transceiver stations 109-i, but it will be clear to those having ordinary skill in the art how and what intervening components are to be interconnected to achieve the depicted connections. It will be clear to those having ordinary skill in the art, after reading the present invention, how to interconnect and configure the depicted elements differently in other embodiments while remaining within the scope of the present invention. For example, in some alternative embodiments, telecommunications analysis server 150 operates within the confines of wireless network 101; in some alternative embodiments, telecommunications analysis server 150 is integrated with location engine 113 such that one hardware platform supports and executes both the functionality of location engine 113 and the functionality of telecommunications analysis server 150, whether as an element of wireless network 101 or as an element external to wireless network 101.

Wireless switching center 107 comprises a switch that orchestrates providing telecommunications service (including voice, text, and packet data) to mobile stations 111-k and, illustratively also orchestrates the flow of information to/from other elements of wireless network 101, e.g., a GMLC (not shown), base station controllers (not shown), base transceiver stations 109-i, a home location register (not shown), visiting location register(s) (not shown), location engine 113, and one or more network probe units 115-i (see FIG. 2B) as described below and in the accompanying figures. It will be clear to those having ordinary skill in the art, after reading the present disclosure, how to make and use alternative embodiments where the flow of information among the above-mentioned elements is differently controlled and/or differently routed, or is accomplished through direct connections between the respective elements.

Wireless switching center 107 comprises equipment and functionality that can also be referred to by other names that are well known in the art such as mobile switching center, mobile telephone switching office, packet data service node, general packet radio service ("GPRS") support node, gateway mobile location center ("GMLC"), base station controller ("BSC"), etc. They are presented herein as a unified entity for the purpose of clarity and ease of understanding. It will be clear to those having ordinary skill in the art that, depending on the wireless network configuration and the underlying switching technologies, wireless switching center 107 could comprise a mobile switching center ("MSC") for circuit-switched services and a data support node (e.g., serving GPRS support node) for packet data services that are distinct entities. They are presented herein as a unified entity for the purpose of clarity and ease of understanding. In accordance with the illustrative embodiment, all of the base transceiver stations 109-i that serve mobile stations 111-k are associated with wireless switching center 107. It will be clear to those skilled in the art, after reading this disclosure, how to make and use alternative embodiments of the present invention in which any number of base transceiver stations are associated with any number of wireless switching centers.

Each base transceiver station 109-i (e.g., 109-1, 109-2, 109-3) comprises the hardware and software necessary to be 3GPP-compliant according to the illustrative embodiment, and is well known in the art. For example and without limitation, base transceiver station 109-i is capable of:

receiving and transmitting electromagnetic signals from/to one of more mobile stations 111, and measuring one or more traits of each of one or more electromagnetic signals (transmitted by mobile station 111-k), and reporting the measurements to location engine 113, detecting one or more of the telecommunications events occurring at mobile station 111-k, and transmitting one or more signals, and reporting the transmission parameters of those signals, and reporting telecommunications events to location engine 113, and reporting on telecommunications events that are associated with a mobile station 111-k.

A "telecommunications event" is defined as an occurrence at a mobile station that is communicated (e.g., requested, reported) by the mobile station to its serving base transceiver station and from there to the base station controller.

Examples of telecommunications events that are typical in a GSM network include without limitation:
  IMSI attach,
  IMSI detach,
  location-area-update,
  call origination,
  text origination,
  data session origination,
  call termination (receiving a call),
  text termination (receiving a text),
  call release or disconnect (ending a call),
  handover request,
  paging response.

Notably, telecommunications events arise from a variety of causes at the mobile station, and not necessarily because of a user-initiated activity; for purposes of the present disclosure, such non-user-initiated events, e.g., location-area-update, IMSI attach, IMSI detach, etc., are considered to be background maintenance between the mobile station and elements of the wireless network and therefore do not give rise to a record of a telecommunications activity such as any of the following:
  a call origination by the mobile station, e.g., the mobile user makes a call to another party,
  a call termination at the mobile station, e.g., the mobile user receives a call from another party,
  a text transmission by the mobile station, e.g., the mobile user sends a text message (e.g., SMS) from the mobile station,
  a text termination at the mobile station, e.g., the mobile station receives a text message (e.g., SMS) from another mobile station,
  a packet data session origination by the mobile station, e.g., the mobile user goes online to access a web site, or establishes a data session to check email,
  a call release or disconnect, e.g., the mobile station's user disconnects (ends) an active call, or abandons the process of dialing a call, or the call "drops" perhaps due to a loss of signal.

Base transceiver station 109-$i$ communicates with mobile stations 111-$k$ via radio frequencies ("RF") and with wireless switching center 107 in well-known fashion. As is well known to those skilled in the art, base transceiver stations are also commonly referred to by a variety of alternative names such as base stations, cellular base transceiver stations, access points, nodes (e.g., Node-B, eNode-B, etc.), network interfaces, cell sites, etc. Although the illustrative embodiment comprises three base transceiver stations, it will be clear to those skilled in the art, after reading the present disclosure, how to make and use alternative embodiments that comprise any number of base transceiver stations.

Additionally, those having ordinary skill in the art will understand that a "cell" is the geographic area that receives wireless service from a particular base transceiver station 109-$i$, and that the identity of the serving base transceiver station 109-$i$ can thus be mapped to a corresponding cell or cell identifier ("cell ID"). Therefore, the term "serving base transceiver station" is used herein to refer to the particular base transceiver station that provides service to a given mobile station 111-$k$, and, correspondingly, the term "serving cell" likewise refers to the geographic area served by the serving base transceiver station. These terms are all understood by persons having ordinary skill in the art. For simplicity, cells are sometimes identified herein by using the identifier of the corresponding base transceiver station 109-$i$.

Each mobile station 111-$k$ (e.g., 111-1, 111-2, 111-3) comprises the hardware and software necessary to be 3GPP-compliant, to originate and receive voice calls, to end or disconnect voice calls, to originate and receive text messages, to originate and end data sessions and transmit and receive data via said data sessions, and to perform the processes described below and in the accompanying figures in accordance with the illustrative embodiment. Mobile station 111-$k$ is mobile and telecommunicates wirelessly. For example and without limitation, mobile station 111-$k$ is capable of:
  transmitting one or more electromagnetic signals, to cellular base transceiver stations 109, including reports of telecommunications events experienced by the respective mobile station, e.g., network management reports, and
  receiving service from one or more of base transceiver stations 109, and
  measuring one or more traits of each of one or more electromagnetic signals (received from one or more base transceiver stations 109, including from a serving base transceiver station ("serving cell") and also from neighboring base transceiver stations ("neighbor cell") whose signals the mobile station receives, and
  reporting the measurements uplink such that they ultimately reach location engine 113, e.g., transmitting network management reports to the serving base transceiver station.

Illustratively, mobile station 111-1 receives electromagnetic signals from base transceiver station 109-1; mobile station 111-2 receives electromagnetic signals from base transceiver stations 109-1 and 109-2; mobile station 111-3 receives electromagnetic signals from base transceiver stations 109-2, and 109-3.

Mobile station 111-$k$ is illustratively a smartphone. It will be clear to those having ordinary skill in the art, after reading the present disclosure, how to make and use telecommunications analysis server 150 to operate with a mobile station 111-$k$ that is a desktop computer (with wireless connectivity), laptop computer, hand-held computer, tablet computer, feature phone, pager, personal digital assistant (PDA), dedicated media player, consumer electronic device, wearable computer, smartwatch, smartglasses (e.g., a Google Glass™ platform), specialized remote-control unit, other type of personal computer system, other computing device, or any combination thereof, for example and without limitation.

Mobile station 111-$k$ is illustratively a device with voice, text, and data services provided and supported by wireless network 101 (whether the mobile stations are active at the same time or at different times). It will be clear to those having ordinary skill in the art, after reading the present disclosure, how to make and use telecommunications analysis server 150 to operate with a mobile station 111-$k$ that is a voice-only device, a data-only device, a device capable of handling a different set or subset of media, or a combination thereof. Mobile stations 111-$k$ are illustratively in service at the same time, but need not be. It will be clear to those skilled in the art, after reading this disclosure, how to make and use alternative embodiments of the present invention that comprise any number of mobile stations supported by wireless network 101.

Location engine 113 comprises hardware and software that estimates a location for a mobile station 111-$k$ (and for any mobile station served by wireless network 101) based, in part, on data obtained from network management reports. Location engine 113 is well known in the art. In some embodiments, location engine 113 is a mass location system that estimates a real-time location of a mobile station whenever a mobile station 111-$k$ reports a telecommunications event to its respective serving base transceiver station 109-$i$, such as a location-area-update, an attach event, a detach event, a call origination, a text transmission, a data session origination, etc. Although numerous geo-location technologies exist in the prior art, the disclosed embodiments comprise a radio-frequency "fingerprinting" technology that is based on empirical radio-frequency measurements reported by each mobile station to its serving base transceiver station along with the telecommunications-event report/request. The empirical measurements collectively enable location engine 113 to estimate with good accuracy where the mobile station is located, e.g., 50-meter accuracy within 5 seconds of the request at the 67th percentile. The locational accuracy provided by location engine 113 far exceeds the cell ID or Enhanced Cell ID location estimates available from some prior art solutions, which cover relatively large geographic areas that far exceed a 50-meter radius. In some embodiments of the present invention, the location estimate provided by location engine 113 comprises an uncertainty radius. As is described in more detail below and according to the illustrative embodiment, the location estimate (with or without the uncertainty radius) is relevant to whether a mobile station can be said to be within earshot of a reported audio incident.

In some alternative embodiments, the reported empirical measurements are captured via a network probe unit 115-$i$ that taps into a connection in the wireless network infrastructure, as explained further below and in regard to FIG. 2B.

According to the illustrative embodiment, location engine 113 estimates a location for an operating mobile station, including a location from which one or more of the following telecommunications events occur, including without limitation: IMSI attach, IMSI detach, location-area-update, call origination, user-initiated call disconnect, text origination, data session origination, etc.

Figure 2B:
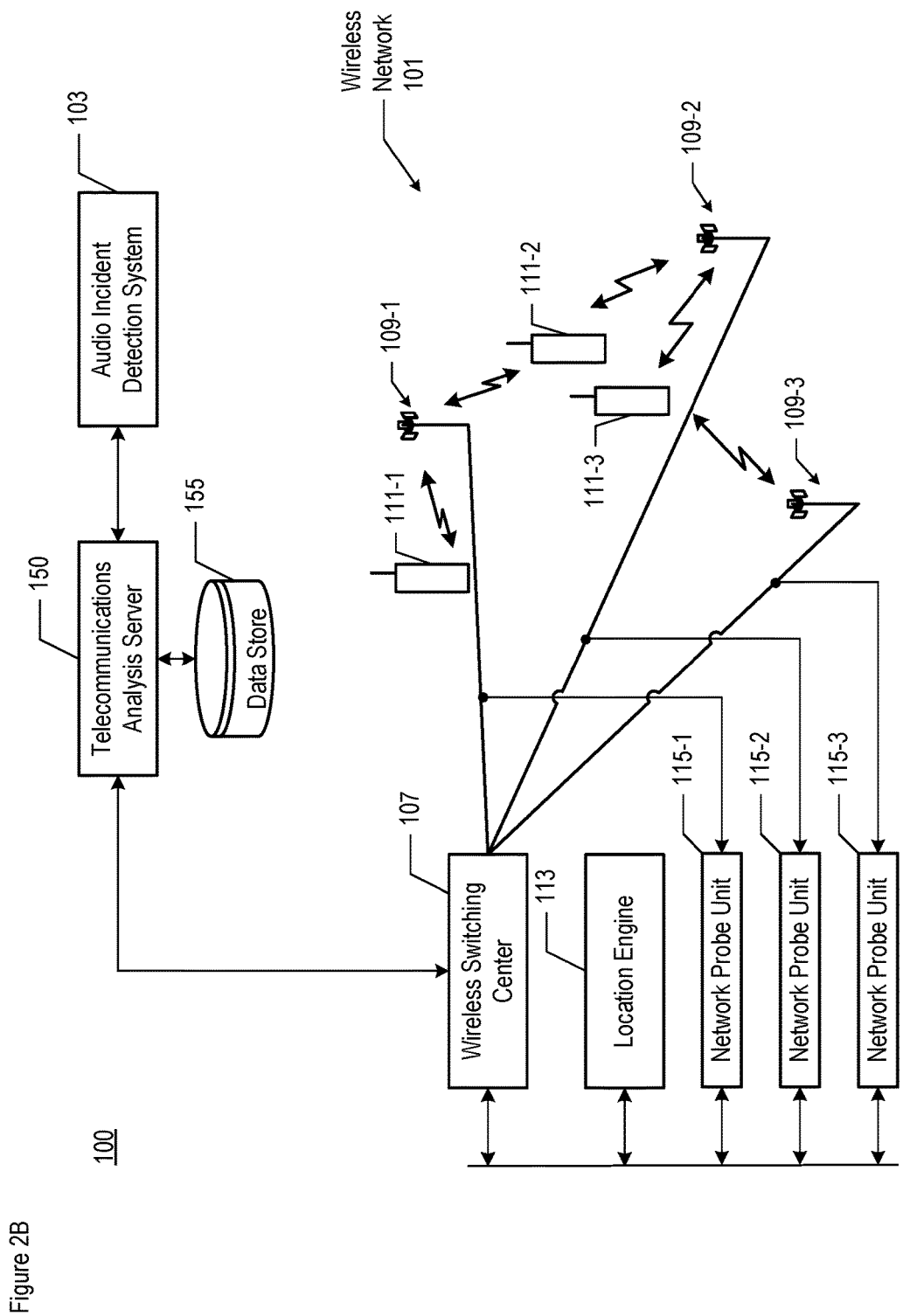
FIG. 2B depicts a schematic diagram of the salient portions of wireless network 101 depicted in FIG. 2A, within telecommunications system 100, shown with installed network probe units according to an alternative embodiment of the present invention.

FIG. 2B depicts a schematic diagram of the salient portions of wireless network 101 depicted in FIG. 2A, within telecommunications system 100, shown with installed network probe units according to an alternative embodiment of the present invention. The present figure depicts network probe units 115-1, 115-2, and 115-3 (115-$i$) installed in wireless network 101 to probe the connections between the corresponding base transceiver station 109-$i$ and the "upstream" network infrastructure illustrated by wireless switching center 107. In GSM networks, a connection between the base transceiver station and a base station controller is known as the Abis link. It will be clear to those having ordinary skill in the art, after reading the present disclosure, how to make and use alternative embodiments wherein network probe units are also and/or alternatively installed on other links within the wireless network, e.g., on the RF link between the mobile station and the base transceiver station, on the link between the base station controller and the mobile switching center, etc. The nomenclature, format, and functionality of these intra-network links will be known to those having ordinary skill in the art regardless of the particular air interface and operating standard of the wireless network.

Network probe units 115-$i$ (e.g., 115-1, 115-2, 115-3) are installed in wireless network 101 in conjunction with the operation of location engine 113. Each network probe unit 115-$i$ passively taps into (or probes) a connection in the wireless network infrastructure. The probe is passive, meaning that it does not interfere with or functionally affect the functioning of the connection that it probes. The probe captures the data that travels on the connection, stores and/or buffers it, and transmits it to one or more other systems where the data is archived and/or processed. Particularly pertaining to the present invention, the probe captures network management reports generated by mobile stations and/or base station controllers.

Probe technology is well known in the art. Each probe unit 115-$i$ transmits the intercepted/tapped data to location engine 113 as is well known in the art, thus enabling location engine 113 to analyze the probed data and to compute an estimated location of the mobile station that transmitted the probed data. According to the alternative embodiment that is illustrated in the present figure, each probe unit 115-$i$ also transmits the intercepted/tapped data to telecommunications analysis server 150 and data store 155. It will be clear to those having ordinary skill in the art, after reading the present disclosure, how to use network probe units 115-$i$ that are appropriate to the particular wireless network, the interface(s) being probed, and the data being probed.

Although network probe units 115-$i$ are not shown in the subsequent figures herein, it should be understood that all methods, systems, and scenarios described below can be implemented with network probe units 115-$i$ as shown in the present figure. Conversely, it should be understood that network probe units are not necessary for the proper operation of the present invention, and that all methods, systems, and scenarios described below where a network probe unit is not expressly recited can be implemented without any network probe units 115-$i$.

Figure 3:
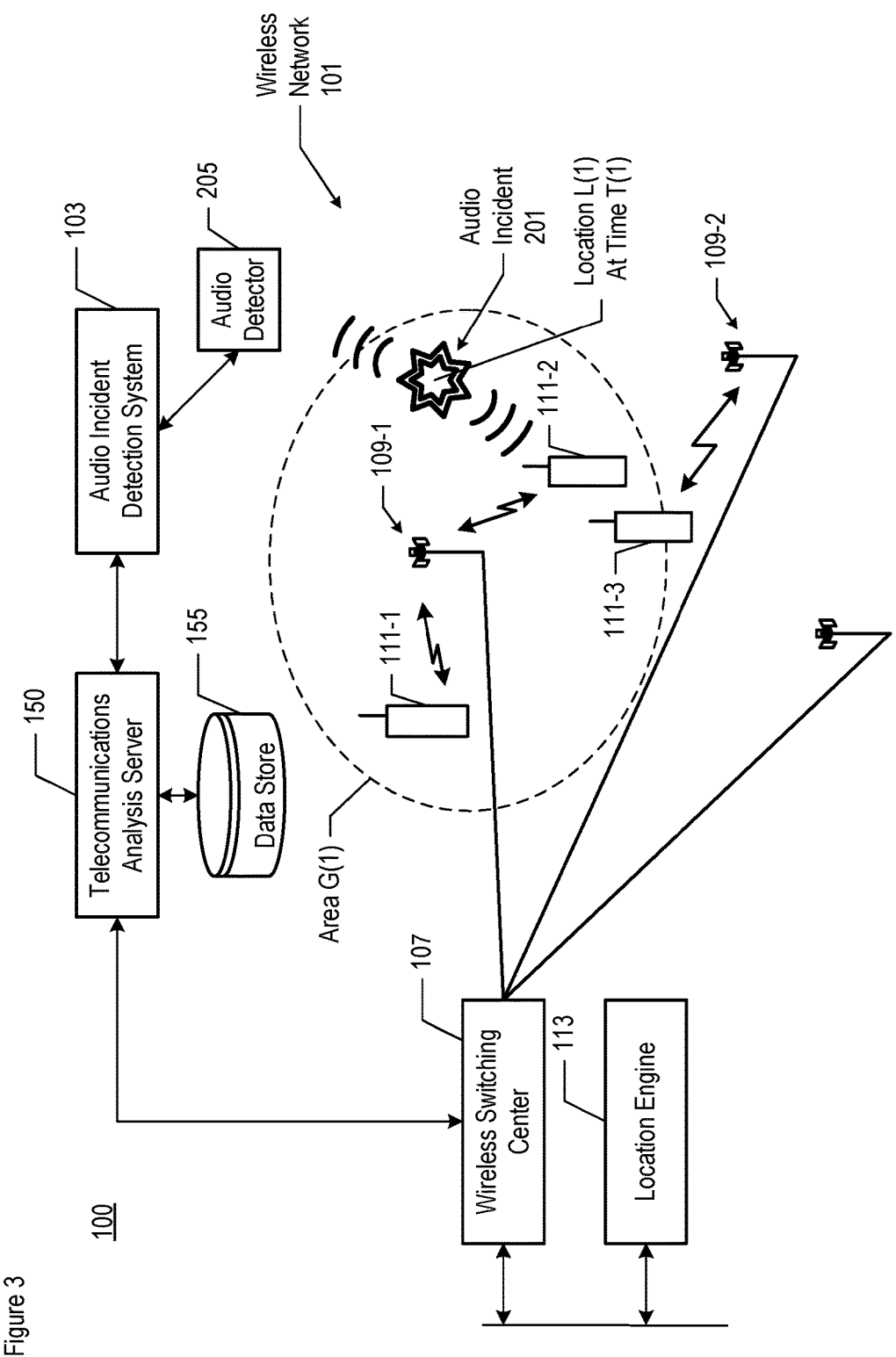
FIG. 3 depicts audio incident 201 occurring at location L(1) and time T(1) in the context of telecommunications system 100.

FIG. 3 depicts audio incident 201 occurring at location L(1) and time T(1) in the context of telecommunications system 100. For simplicity and ease of understanding, some of the details depicted in the preceding figures are not shown in FIG. 3. Also for simplicity, only serving-cell relationships are illustrated here with regard to the mobile stations, such that base transceiver station 109-1 is the serving base transceiver station (serving cell) for mobile stations 111-1 and 111-2, and base transceiver station 109-2 is the serving base transceiver station (serving cell) for mobile station 111-3.

Additionally, FIG. 3 also depicts: audio incident 201, which illustratively occurs at location L(1) at time T(1); geographic area G(1), which represents the cell coverage area served by base transceiver station 109-1 and which comprises location L(1); and audio detector 205. According to the present figure, in wireless network 101, only base transceiver station 109-1 covers location L(1) and therefore only geographic area G(1) comprises the location L(1) of the illustrated audio incident. Notably, wireless network 101 also has one or more cells that cover location L(1), but those details are not depicted here for the purpose of simplicity.

Audio detector 205 interacts with audio incident detection system 103. Each audio detector 205 is a sensor that receives acoustic signals from the ambient environment and reports relevant data to audio incident detection system 103 according to technology that is well known in the art. Audio detector 205 is equipped with the necessary audio sensing equipment, filters, buffers, etc. as is well known in the art. Although audio incident detection system 103 is shown equipped with only one audio detector 205, it will be clear to those having ordinary skill in the art how to configure any number of audio detectors 205. It will be clear to those having ordinary skill in the art, after reading the present disclosure, how to make and use alternative embodiments that operate with any number of audio detectors connected to audio incident detection system 103, and how to make and use alternative embodiments that operate with any number of audio incident detection systems 103.

Figure 4:
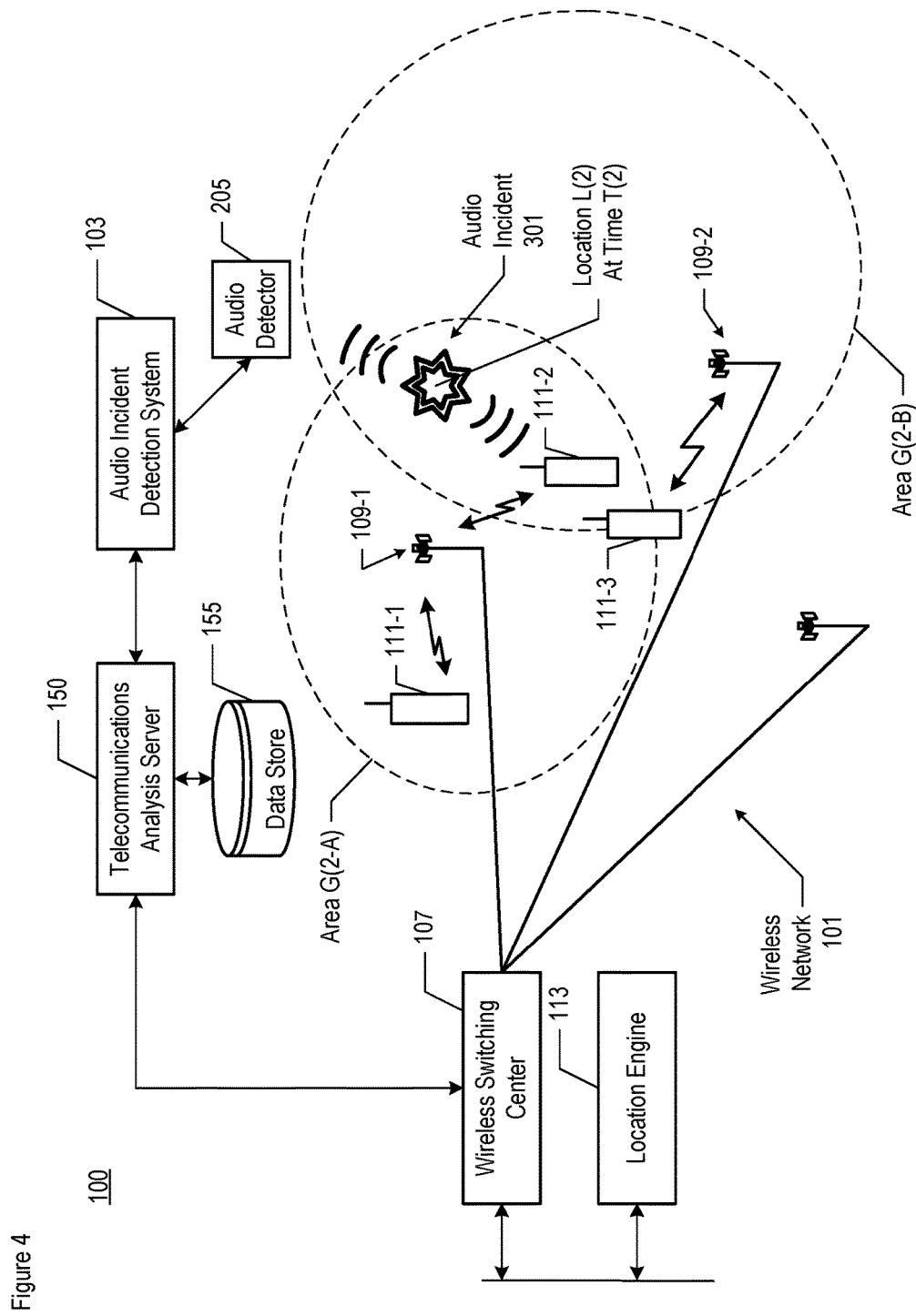
FIG. 4 depicts audio incident 301 occurring at location L(2) and time T(2) in the context of telecommunications system 100.

FIG. 4 depicts audio incident 301, which is different than incident 201, occurring at location L(2) and time T(2) in the context of telecommunications system 100. For simplicity and ease of understanding, some of the details depicted in the preceding figures are not shown in the present figure. For simplicity, only serving-cell relationships are illustrated here with regard to the mobile stations, such that base transceiver station 109-1 is the serving base transceiver station (serving cell) for mobile stations 111-1 and 111-2, and base transceiver station 109-2 is the serving base transceiver station (serving cell) for mobile station 111-3.

Additionally, FIG. 4 also depicts: audio incident 301, which illustratively occurs at location L(2) at time T(2); geographic area G(2-A), which represents the cell coverage area served by base transceiver station 109-1 and comprises location L(2); and geographic area G(2-B), which represents the cell coverage area served by base transceiver station 109-2 and also comprises location L(2). Geographic area G(2-A) overlaps in part with geographic area G(2-B), such that incident location L(2) lies within the overlap. Geographic area(s) covered by the other base transceiver station(s) in wireless network 101 are not shown and do not comprise incident location L(2).

According to the present figure, geographic areas G(2-A) and G(2-B) both comprise the location L(2) of the illustrated incident, i.e., both base transceiver stations (cell sites) 109-1 and 109-2 cover location L(2). Additionally, in wireless network 101, only base transceiver stations 109-1 and 109-2 cover location L(2) and, therefore, only geographic areas G(2-A) and G(2-B) comprise the location L(2) of the illustrated audio incident 301. Notably, wireless network 102, in addition to network 101, also has one or more cells that cover incident location L(2), but those details are not depicted here for the purpose of simplicity.

Figure 5:
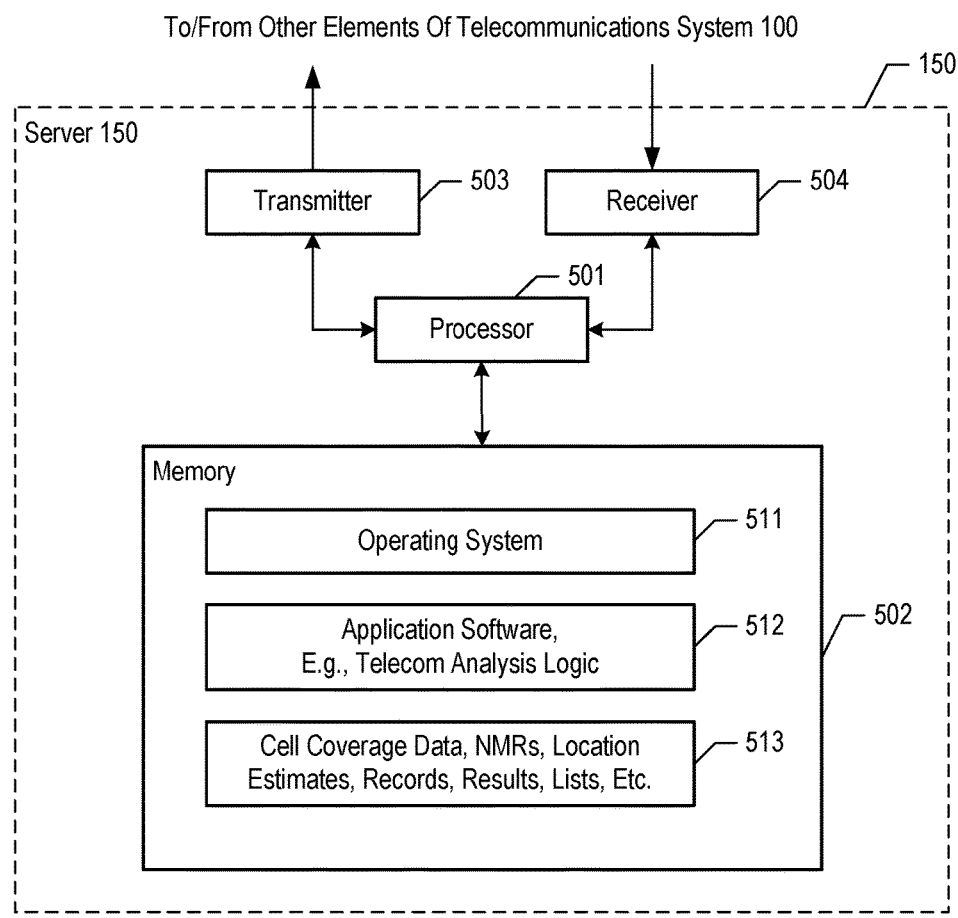
FIG. 5 depicts a schematic diagram of the hardware platform of the illustrative telecommunications analysis server 150.

FIG. 5 depicts a schematic diagram of the hardware platform of the illustrative telecommunications analysis server 150. According to the illustrative embodiment, telecommunications analysis server 150 is an apparatus that is a data-processing system, illustratively a server computer, whose hardware platform comprises: processor 501, memory 502, transmitter 503 and receiver 504.

Processor 501 is a processing device such as a microprocessor that is well known in the art. Processor 501 is configured such that, when operating in conjunction with the other components of server 150, processor 501 executes software, processes data, and telecommunicates according to the operations described herein.

Memory 502 is non-transitory and non-volatile computer storage memory technology that is well known in the art, e.g., flash, RAM, ROM, etc. Memory 502 stores operating system 511, application software 512, and element 513 that comprises cell coverage data, NMRs, other data, location estimates, parameters, records, results, lists, etc. The specialized application software 512 that is executed by processor 501 is illustratively denominated the "telecommunications analysis logic" that enables telecommunications analysis server 150 to perform the operations of methods 600 and 700, and variations thereof. Memory element 513 illustratively comprises the cell coverage data of wireless network 101 (and any other wireless networks that are served by telecommunications analysis server 150, such as wireless network 102), and NMRs and location estimates. Memory element 513 also comprises other data, records, results, lists, associations, indicators, whether of an intermediate nature, final results, or archival. It will be clear to those having ordinary skill in the art how to make and use alternative embodiments that comprise more than one memory 502; or comprise subdivided segments of memory 502; or comprise a plurality of memory technologies that collectively store operating system 511, application software 512, and element 513.

Transmitter 503 is a component that enables telecommunications analysis server 150 to telecommunicate with other components and systems by transmitting signals thereto. For example, transmitter 503 enables telecommunication pathways to wireless networks (e.g., wireless network 101, wireless network 102, and any other supported networks), audio incident detection system 103, public safety system 104, etc., other systems, data store 155, the public switched telephone network, internet and private data networks, electronic displays, mobile stations, fixed stations, etc. without limitation. Transmitter 503 is well known in the art. It will be clear to those having ordinary skill in the art how to make and use alternative embodiments that comprise more than one transmitter 503. Transmitter 503 is shown in a wired configuration, but in some alternative embodiments, transmitter 503 may enable wireless telecommunications.

Receiver 504 is a component that enables telecommunications analysis server 150 to telecommunicate with other components and systems by receiving signals therefrom. For example, receiver 504 enables telecommunication pathways from wireless networks (e.g., wireless network 101, wireless network 102, and any other supported networks), audio incident detection system 103, public safety system 104, etc., other systems, data store 155, the public switched telephone network, internet and private data networks, electronic displays, mobile stations, fixed stations, etc. without limitation. Receiver 504 is well known in the art. It will be clear to those having ordinary skill in the art how to make and use alternative embodiments that comprise more than one receiver 504. Receiver 504 is shown in a wired configuration, but in some alternative embodiments, receiver 504 may enable wireless telecommunications.

It will be clear to those skilled in the art, after reading the present disclosure, that in some alternative embodiments the hardware platform of telecommunications analysis server 150 can be embodied as a multi-processor platform, as a data-processing system, as a sub-component of a larger computing platform, as a virtual computing element, or in some other computing environment—all within the scope of the present invention. It will be clear to those skilled in the art, after reading the present disclosure, how to make and use the hardware platform for telecommunications analysis server 150.

Figure 6:
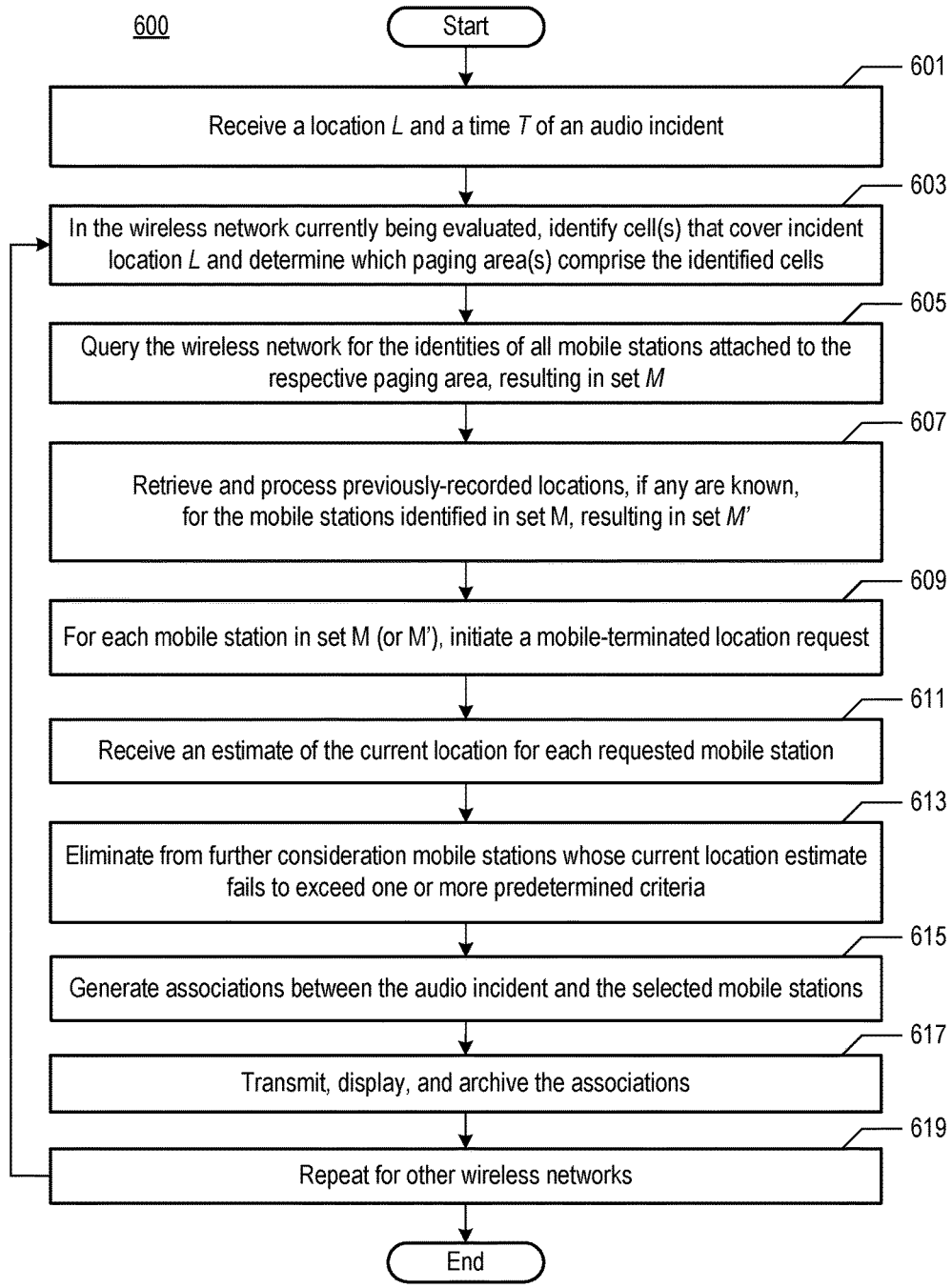
FIG. 6 depicts some salient operations of method 600 according to an illustrative embodiment of the present invention.

FIG. 6 depicts some salient operations of method 600 according to an illustrative embodiment of the present invention. Telecom analysis server 150 is the entity within illustrative telecommunications system 100 that executes and coordinates the operations of method 600 according to the illustrative embodiment of the capacity allocation logic.

At operation 601, server 150 receives an indication of an audio incident from audio incident detection system 103, wherein the indication indicates a location L and a time T of an audio incident. In some alternative embodiments, the received indication indicates location L, but not time T, while in other alternative embodiments the received indication indicates time T, but not location L. As those who are skilled in the art will appreciate, after reading this specification, server 150 can receive the indication from another system than detection system 103, such as public safety system 104.

Server 150, in some alternative embodiments, is capable of receiving and processing one or more characteristics instead of or in addition to location L and/or time T of the audio incident. Such characteristics include the type of audio incident that has occurred and/or the acoustic fingerprint of the sound produced by the audio incident. For example, a first type of audio incident could be a gunshot, while a second type of audio incident could be a bomb detonation. In some embodiments of the present invention, the type of audio incident is distinguished from one type to another by the physical cause (e.g., bullet firing, bomb exploding, car crashing, lightning flashing, etc.) of the sound produced by the audio incident.

At operation 603, for a wireless network currently being evaluated (e.g., wireless network 101), server 150 identifies one or more cells belonging to the wireless network that cover location L. In accordance with the illustrative embodiment, server 150 identifies the covering cells by using one or more coverage maps. In some alternative embodiments, server 150 identifies the covering cells using a different technique.

After identifying the cells, server 150 then determines which paging area or areas comprise the identified cells. A "paging area" is defined as a set of cells that broadcast a given paging request. As those who are skilled in the art will appreciate after reading this specification, a paging area can be a location area, routing area, tracking area, or some other equivalent type of area depending on the wireless protocol involved, for example and without limitation. In some alternative embodiments of the present invention, a paging area can be determined directly from knowing the location L and without first identifying individual cells.

The aforementioned identifying of the cells and/or the determining of the paging areas are based on one or more of the following, without limitation:
 i. the location L received at operation 601,
 ii. an uncertainty radius (or equivalent) associated or received with the location L,
 iii. the particular paging area comprising the location L,
 iv. the particular cell comprising the location L,
 v. the time T received at operation 601,
 vi. the type of audio incident (e.g., gunshot, bomb detonation, car crash, etc.) that occurred and received at operation 601,
 vii. the acoustic fingerprint of the sound produced by the audio incident,
 viii. a particular telecommunications event having been reported, as defined above and in regard to FIG. 2A.

At operation 605, server 150 queries the wireless network currently being evaluated for the identities of mobile stations that are attached to the respective paging areas determined at operation 603. In accordance with the illustrative embodiment, server 150 queries the visitor location register (VLR) of each paging area for the mobile stations in that paging area, resulting in set M.

At operation 607, server 150 optionally retrieves and processes previously recorded locations, if any are known, for the mobile stations identified in set M. The mobile stations that result are identified in set M'. Operation 607 is described in more detail below and in FIG. 7.

At operation 609, for each mobile station in set M (or M'), server 150 initiates a mobile-terminated location request (MT-LR) as is known in the art. The initiating of an MT-LR for a given mobile station is based on one or more of the following, without limitation:
 i. the location L received at operation 601,
 ii. an uncertainty radius (or equivalent) associated or received with the location L,
 iii. the mobile station being attached to a particular paging area of the wireless network currently being evaluated,
 iv. the particular paging area comprising the location L,
 v. the mobile station being served by a particular cell of the wireless network currently being evaluated,
 vi. the particular cell comprising the location L,
 vii. the time T received at operation 601,
 viii. the type of audio incident (e.g., gunshot, bomb detonation, car crash, etc.) that occurred and received at operation 601,
 ix. the acoustic fingerprint of the sound produced by the audio incident,
 x. a particular telecommunications event having been reported, as defined above and in regard to FIG. 2A.

At operation 611, for each mobile station for which an MT-LR was initiated, server 150 receives an estimate of the current location of the mobile station from location engine 113, in response to the initiating of the MT-LR. As those who are skilled in the art will appreciate, after reading this specification, server 150 can receive the indication from another system than location engine 113, such as from the mobile station itself.

In some alternative embodiments, server 150 receives the estimate of the current location only when the mobile station affirmatively responds to the MT-LR.

In some other alternative embodiments, instead of receiving an estimate of the current location of the mobile station, server 150 instead receives data that is evidence of a location and generates itself the estimate of the current location based on the received data.

At operation 613, server 150 eliminates from further consideration mobile stations whose current location estimate fails to exceed one or more predetermined criteria such as, but not limited to, criteria related to a mobile station's proximity to location L. Server 150 eliminates mobile stations based on one or more of the following criteria, without limitation:
 i. the estimate exceeding a predetermined distance from location L,
 ii. the estimate being within a predetermined distance from location L (i.e., the opposite of item i immediately above),
 iii. a predetermined relationship of the estimate to the location L being met.

In some scenarios, no mobile stations are eliminated from further consideration, while in other scenarios one or more mobile stations are eliminated, and possibly all mobile stations.

In some embodiments, the predetermined distance and/or the predetermined relationship is based on one or more of the following, without limitation:
 i. the location L received at operation 601,
 ii. an uncertainty radius (or equivalent) associated or received with the location L,
 iii. the particular paging area comprising the location L,
 iv. the particular cell comprising the location L,
 v. the time T received at operation 601,
 vi. the type of audio incident (e.g., gunshot, bomb detonation, car crash, etc.) that occurred and received at operation 601,
 vii. the acoustic fingerprint of the sound produced by the audio incident,
 viii. a particular telecommunications event having been reported, as defined above and in regard to FIG. 2A.

At operation 615, server 150 generates an association between the audio incident and each of the remaining mobile stations, based on one or more of the following, without limitation:

i. the estimate of the current location of the mobile station,
ii. the location L received at operation 601,
iii. an uncertainty radius (or equivalent) associated or received with the location L,
iv. the estimate being within a predetermined distance of the location L,
v. the time T received at operation 601,
vi. the estimate being within a predetermined distance of the location L, wherein the predetermined distance is based on the time T,
vii. an estimate of the current location of a different mobile station in the same wireless network,
viii. an estimate of the current location of a different mobile station in a different wireless network,
xi. the type of audio incident (e.g., gunshot, bomb detonation, car crash, etc.) that occurred and received at operation 601,
ix. the acoustic fingerprint of the sound produced by the audio incident,
x. a particular telecommunications event having been reported, as defined above and in regard to FIG. 2A.

At operation 617, server 150 transmits (e.g., to detection system 103, etc.), displays, and/or archives each generated association in well-known fashion. In accordance with the illustrative embodiment, the association comprises an indicium of the mobile station associated with the audio incident and is transmitted to another server computer.

In some embodiments of the present invention, server 150 triggers activities such as location tracking of one or more mobile stations associated with the audio incident. Server 150 might trigger the location tracking autonomously or might receive instructions from another system (e.g., detection system 103, etc.) to perform the location tracking of one or more mobile stations.

At operation 619, server 150 optionally repeats operations 603 through 617 for one or more additional wireless networks (e.g., wireless network 102) to be evaluated. In some embodiments of the present invention, the repeating of one or more of the aforementioned operations for one or more additional networks is based on one or more of the following, without limitation:
i. the location L received at operation 601,
ii. an uncertainty radius (or equivalent) associated or received with the location L,
iii. the particular paging area comprising the location L,
iv. the particular cell comprising the location L,
v. the time T received at operation 601,
vi. the type of audio incident (e.g., gunshot, bomb detonation, car crash, etc.) that occurred and received at operation 601,
vii. the acoustic fingerprint of the sound produced by the audio incident,
viii. a particular telecommunications event having been reported, as defined above and in regard to FIG. 2A,
ix. the number of mobile stations in set M (or M') in one or more previous iterations.

In regard to method 600, it will be clear to those having ordinary skill in the art, after reading the present disclosure, how to make and use alternative embodiments of method 600 wherein the recited operations and sub-operations are differently sequenced, grouped, or sub-divided—all within the scope of the present invention. It will be further clear to those skilled in the art, after reading the present disclosure, how to make and use alternative embodiments of method 600, as well as of method 700 and any other method disclosed herein, wherein some of the recited operations and sub-operations are optional, are omitted, or are executed by other elements and/or systems.

Figure 7:
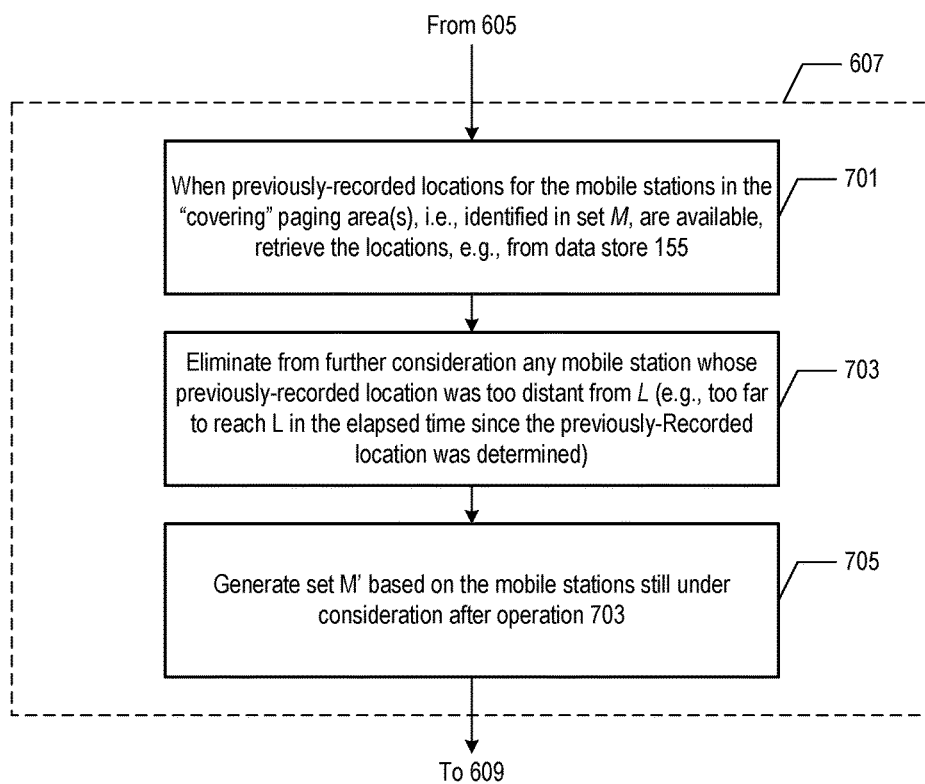
FIG. 7 depicts the salient sub-operations of operation 607 of method 600.

FIG. 7 depicts the salient sub-operations of operation 607 of method 600.

At operation 701, server 150 retrieves from data store 155 any previously recorded locations for the mobile stations identified in set M. As those who are skilled in the art will appreciate, after reading this specification, server 150 can receive the indication from another system than data store 155.

At operation 703, server 150 eliminates mobile stations from further consideration based on one or more of the following criteria, without limitation:
i. the previously recorded estimate exceeding a predetermined distance from location L,
ii. the previously recorded estimate being within a predetermined distance from location L (i.e., the opposite of item i immediately above),
iii. a predetermined relationship of the previously recorded estimate to the location L being met.

In some scenarios, no mobile stations are eliminated from further consideration, while in other scenarios one or more mobile stations are eliminated, and possibly all mobile stations.

At operation 705, server 150 generates set M' of identified mobile stations, based on the mobile stations still remaining under consideration after operation 703.

After operation 705, control of execution returns to operation 609.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, by a server computer, an indication of an audio incident, wherein the indication indicates i) a location L of the audio incident and ii) type of audio incident that has occurred, wherein the type of audio incident is one of a plurality of types that are distinguished from one another by physical cause of sound produced by each audio incident;
initiating, by the server computer, a first mobile-terminated location request (MT-LR) for a first mobile station in a first wireless network with a coverage area that comprises the location L, wherein the initiating is based on i) the location L and ii) the type of audio incident indicated by the received indication; and
transmitting, by the server computer, an indicium of the first mobile station to another server computer, based on an estimate of the current location of the first mobile station relative to the location L, wherein the current location is made available in response to the first MT-LR.

2. The method of claim 1 wherein the initiating of the first MT-LR for the first mobile station is further based on i) the first mobile station being attached to a first paging area of the first wireless network and ii) the first paging area comprising the location L.

3. The method of claim 1 wherein the initiating of the first MT-LR for the first mobile station is further based on i) the first mobile station being served by a first cell of the first wireless network and ii) the first cell comprising the location L.

4. The method of claim 1 further comprising:
generating, by the server computer, an association between the first mobile station and the audio incident, wherein the generating of the association is based on the estimate of the current location of the first mobile station relative to the location L.

5. The method of claim 4 wherein the generating of the association occurs only when the estimate of the current location of the first mobile station is within a predetermined distance of the location L.

6. The method of claim 5 wherein the received indication further indicates a time T of the audio incident, and wherein the predetermined distance is based on the time T indicated by the received indication.

7. The method of claim 4 further comprising:
initiating, by the server computer, a second MT-LR for a second mobile station in the first wireless network;
wherein the generating of the association between the first mobile station and the audio incident is based on an estimate of the current location of the second mobile station that is made available in response to the second MT-LR.

8. The method of claim 4 further comprising:
initiating, by the server computer, a second MT-LR for a second mobile station in a second wireless network with a coverage area that comprises the location L;
wherein the generating of the association between the first mobile station and the audio incident is based on an estimate of the current location of the second mobile station that is made available in response to the second MT-LR.

9. The method of claim 1 further comprising:
receiving, by the server computer in response to the first MT-LR, the estimate of the current location of the first mobile station, wherein the estimate of the current location of the first mobile station is based on a network management report (NMR) generated by the first mobile station.

10. A method comprising:
identifying, by a server computer, a cell that provides wireless service coverage to a geographic area that comprises a location L of an audio incident, wherein the identifying is in response to i) an indication of the audio incident at the location L and ii) an indication of type of audio incident that has occurred, wherein the type of audio incident is one of a plurality of types that are distinguished from one another by physical cause of sound produced by each audio incident;
initiating, by the server computer, a first mobile-terminated location request (MT-LR) for a first mobile station that is served by the identified cell;
receiving, by the server computer, an estimate of a current location of the first mobile station in response to the first MT-LR;
generating, by the server computer, an association between the first mobile station and the audio incident, wherein the generating of the association is based on the estimated current location of the first mobile station relative to the location L; and
transmitting, by the server computer, the association to another server computer.

11. The method of claim 10 wherein the generating of the association is based on the estimated current location of the first mobile station being within a predetermined distance of location L.

12. The method of claim 10 further comprising:
initiating, by the server computer, a second MT-LR for a second mobile station;
wherein the generating of the association between the first mobile station and the audio incident is based on an estimate of the current location of the second mobile station that is made available in response to the second MT-LR.

13. The method of claim 12 wherein the second mobile station is in a wireless network with a coverage area that comprises the location L, wherein the wireless network does not include the cell.

14. The method of claim 10 wherein the identifying of the cell is further based on a time T of the audio incident.

15. A method comprising:
receiving, by a server computer, an indication of an audio incident, wherein the indication indicates i) a location L of the audio incident, ii) a time T of the audio incident, and iii) type of audio incident that has occurred, wherein the type of audio incident is one of a plurality of types that are distinguished from one another by physical cause of sound produced by each audio incident;
initiating, by the server computer, a first mobile-terminated location request (MT-LR) for a first mobile station in a first wireless network with a coverage area that comprises the location L, wherein the initiating is based on i) the location L, the time T, and iii) the type of audio incident indicated by the received indication;
receiving, by the server computer in response to the first MT-LR, an estimate of the current location of the first mobile station; and
transmitting, by the server computer, an indicium of the first mobile station to another server computer, based on the estimate of the current location of the first mobile station relative to the location L.

16. The method of claim 15 further comprising:
generating, by the server computer, an association between the first mobile station and the audio incident, wherein the generating of the association is based on the estimate of the current location of the first mobile station relative to the location L.

17. The method of claim 16 wherein the generating of the association occurs only when the estimate of the current location of the first mobile station is within a predetermined distance of the location L.

18. The method of claim 17 wherein the predetermined distance is based on the time T indicated by the received indication.

19. The method of claim 16 further comprising:
initiating, by the server computer, a second MT-LR for a second mobile station in the first wireless network;
wherein the generating of the association between the first mobile station and the audio incident is based on an estimate of the current location of the second mobile station that is made available in response to the second MT-LR.

* * * * *